(12) United States Patent
Petersen et al.

(10) Patent No.: US 11,818,236 B1
(45) Date of Patent: *Nov. 14, 2023

(54) PROTOCOL INDEPENDENT DATA UNIT FORWARDING

(71) Applicant: Ethernovia Inc., San Jose, CA (US)

(72) Inventors: Brian Arnold Petersen, San Francisco, CA (US); Roy T. Myers, Jr., Morgan City, CA (US); Darren S. Engelkemier, Menlo Park, CA (US); Hossein Sedarat, San Jose, CA (US); Ramin Shirani, Morgan Hill, CA (US); Tom Quoc Wellbaum, San Jose, CA (US); Poon-Kuen Leung, Fremont, CA (US)

(73) Assignee: Ethernovia Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/807,255

(22) Filed: Jun. 16, 2022

Related U.S. Application Data

(63) Continuation of application No. 16/926,057, filed on Jul. 10, 2020, now Pat. No. 11,394,813.

(Continued)

(51) Int. Cl.
*H04L 69/18* (2022.01)
*H04L 69/22* (2022.01)
(Continued)

(52) U.S. Cl.
CPC ............ *H04L 69/18* (2013.01); *H04L 49/252* (2013.01); *H04L 49/3027* (2013.01); *H04L 69/22* (2013.01); *H04L 2212/00* (2013.01)

(58) Field of Classification Search
CPC ... H04L 69/18; H04L 49/252; H04L 69/3027; H04L 2212/00
See application file for complete search history.

(56) References Cited

U.S. PATENT DOCUMENTS 10,778,588 B1 * 9/2020 Singh ..................... H04L 12/18
11,394,813 B1 * 7/2022 Petersen ............. H04L 49/3027
(Continued)

OTHER PUBLICATIONS

"U.S. Appl. No. 16/926,057, Non Final Office Action dated Oct. 15, 2021", 13 pgs.

(Continued)

*Primary Examiner* — Kibrom T Hailu
(74) *Attorney, Agent, or Firm* — Schwegman Lundberg & Woessner, P.A.

(57) ABSTRACT

Disclosed are systems, methods, and non-transitory computer-readable media for protocol independent data unit forwarding. A packet forwarding system receives a data unit comprising a header byte string via an input port. The packet forwarding system parses the data unit based on a header type determined based on the input port, yielding a parsing output describing the header byte string of the data unit. The packet forwarding system updates a metadata item associated with the data unit based on the parsing output and determines a packet forwarding instruction for forwarding the data unit to a destination based on the metadata item associated with the data unit. The packet forwarding system forwards the data unit to the destination based on the packet forwarding instruction and the metadata item associated with the data unit.

20 Claims, 9 Drawing Sheets

Related U.S. Application Data

(60) Provisional application No. 63/013,440, filed on Apr. 21, 2020, provisional application No. 62/872,458, filed on Jul. 10, 2019.

(51) Int. Cl.
*H04L 49/00* (2022.01)
*H04L 49/25* (2022.01)

(56) References Cited

U.S. PATENT DOCUMENTS

| | | | |
|---|---|---|---|
| 2007/0019661 A1* | 1/2007 | Rowett | H04L 49/90 370/419 |
| 2016/0357781 A1* | 12/2016 | Bastide | G06F 16/185 |
| 2021/0144405 A1* | 5/2021 | Sharangpani | H04N 19/103 |
| 2021/0160350 A1* | 5/2021 | Volpe | H04L 47/2483 |

OTHER PUBLICATIONS

"U.S. Appl. No. 16/926,057, Notice of Allowance dated Mar. 17, 2022", 10 pgs.

"U.S. Appl. No. 16/926,057, Response filed Jan. 18, 2022 to Non Final Office Action dated Oct. 15, 2021", 11 pgs.

* cited by examiner

PROTOCOL INDEPENDENT DATA UNIT FORWARDING

CROSS-REFERENCE TO RELATED APPLICATIONS

The present application is a continuation of U.S. patent application Ser. No. 16/926,057, filed on Jul. 10, 2020, which claims the benefit of priority of U.S. Provisional Application No. 62/872,458, filed on Jul. 10, 2019, and U.S. Provisional Application No. 63/013,440, filed on Apr. 21, 2020, all of which are incorporated herein by reference in their entirety.

TECHNICAL FIELD

An embodiment of the present subject matter relates generally to data forwarding, and more specifically, to protocol independent data unit forwarding.

BACKGROUND

Computer networking allows for the exchange of data between various interconnected devices. Data transmitted from one device to another is a broken into smaller data units (e.g., data packet, data frames), which are each transmitted separately along a network path to their destination. Each data unit consists of an ordered set of individual values, such as a binary number made up of an ordered set of zeroes and ones (e.g., 0001, 0010, etc.) or contiguous groups of eight binary digits (bytes). The data units are generated using various communication protocols (e.g., Ethernet, Internet Protocol, (IP), User Datagram Protocol (UDP)) that define the rules, syntax and semantics for arranging a data unit. For example, a communication protocol may define a length of the data unit (e.g., number of individual values (bytes)), as well as identify the types of data that are to be stored in the various positions of the data unit, such as identifying the range of bytes (e.g., bytes 0-127) that store the header, transferred data (e.g., payload), and/or trailer.

The header may include data used to deliver a data unit to its intended destination, such as by including data identifying the data unit type (e.g., the communication protocol used to generate the data unit), a source address, a destination address, and the like. Multiple communication protocols may be used to transmit data through use of data encapsulation. Encapsulation is a method in which a data unit generated using one communication protocol is stored as the payload of a data unit generated using a different communication protocol or another instance of the same protocol. The header type of the outermost header defines the data unit type of the data unit. In some cases, a data unit may be the encapsulated multiple times resulting in a data unit that is encapsulated in multiple layers of headers.

Current data forwarding systems provide limited functionality when processing encapsulated data units. For example, current data forwarding systems do not modify or replace the innermost header, resulting in restrictions on the types of devices that are able to communicate directly via a network. A common work-around for such restrictions is to deliver a data unit to a Central Processing Unit (CPU), where software is used to re-cast the data unit into a different data unit type. While this approach can work, it presents significant performance bottlenecks and greatly increases the resource and power consumption of the system and network.

BRIEF DESCRIPTION OF THE DRAWINGS

Various ones of the appended drawings merely illustrate example embodiments of the present disclosure and cannot be considered as limiting its scope.

DETAILED DESCRIPTION

In the following description, for purposes of explanation, various details are set forth in order to provide a thorough understanding of some example embodiments. It will be apparent, however, to one skilled in the art, that the present subject matter may be practiced without these specific details, or with slight alterations.

Disclosed are systems, methods, and non-transitory computer-readable media for protocol independent data unit forwarding. A protocol independent data unit forwarding system is configured to process and forward data units of various communication protocol types, such as Ethernet, IP, IPv4, IPv6, UDP, Audio Video Transport Protocol (AVTP), and the like. The protocol independent data unit forwarding system includes multiple functional components providing functionality to properly process and forward a data unit to its intended destination. For example, the functional components may provide functionality such as interpreting headers included in a data unit, terminating tunnels if needed, identifying a data unit's destination, re-encapsulating the payload as needed, and the like. The functional components of the data unit forwarding system are communication protocol type agnostic, meaning that the functional components use a common set of operations, logic, templates, and/or tables to process a data unit regardless of its communication protocol type. This is in contrast to current forwarding systems that employ specialized sets of functions for different communication protocol types. As a result, the protocol independent data unit forwarding system is not limited in the types of data units it can process or the types of network segments to which a data unit may be forwarded.

Figure 1:
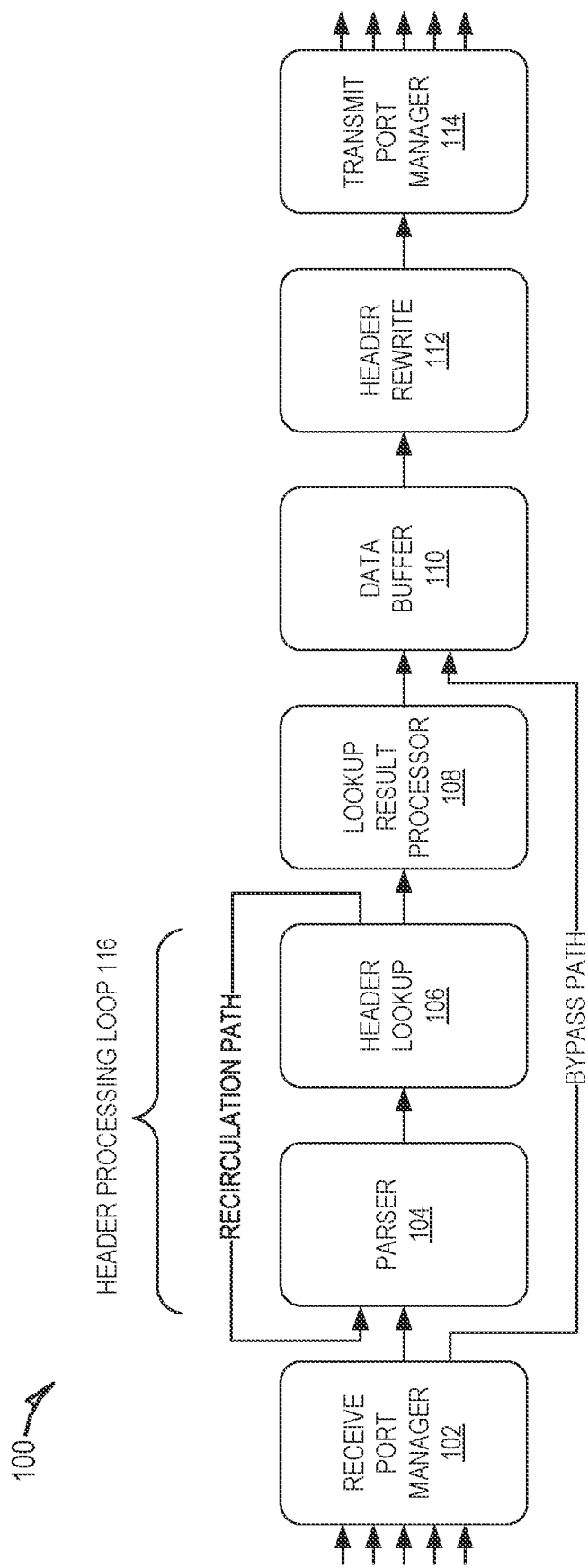
FIG. 1 is a block diagram of a protocol independent data unit forwarding system, according to certain example embodiments.

FIG. 1 is a block diagram of a protocol independent data unit forwarding system 100, according to certain example embodiments. To avoid obscuring the inventive subject matter with unnecessary detail, various functional components (e.g., modules, mechanisms, devices, nodes, etc.) that are not germane to conveying an understanding of the inventive subject matter have been omitted from FIG. 1. However, a skilled artisan will readily recognize that various additional functional components may be supported by the protocol independent data unit forwarding system 100 to facilitate additional functionality that is not specifically described herein.

The protocol independent data unit forwarding system 100 provides for the exchange of data between various interconnected devices. The devices may be of any of a variety of types of devices capable of network communication with other devices. For example, each device can include some or all of the features, components, and peripherals of the machine 900 shown in FIG. 9. Similarly, the protocol independent data unit forwarding system 100 may be implemented on any of a variety of types of devices capable of network communication with other devices, such as a device including some or all of the features, components, and peripherals of the machine 900 shown in FIG. 9.

As shown, the protocol independent data unit forwarding system 100 includes multiple functional components connected in series to provide a data processing pipeline for protocol independent data unit forwarding. Each functional component may be a physical data processing element configured to perform various data processing functions based on received input data. A functional component may generate a data output, which may be provided as input into other functional components in the data processing pipeline.

As shown, the protocol independent data unit forwarding system 100 includes a receive port manager 102, a parser 104, a header lookup 106, a lookup result processor 108, a data buffer 110, a header rewrite 112, and a transmit port manager 114.

The receive port manager 102 embodies various Media Access Controllers (MACs) and operates to receive data units transmitted in a network via an assortment of external ports. The external ports may include Ethernet, as well as a variety of specialty ports such as Camera Serial Interface (CSI), Controller Area Network (CAN), Local Interconnect Network (LIN), and the like. Each port is identified by a unique port identifier.

After receiving a data unit, the receive port manager 102 may perform a variety of data processing operations to generate an output that can be provided to the other functional components of the protocol independent data unit forwarding system 100. For example, the receive port manager 102 may initially perform any media specific adaptations on the received data unit as well as multiplex the data units of the several receive ports to a multiplexed path of the data processing pipeline such that the data unit, or any portion, thereof may be transmitted to the other downstream functional components of the protocol independent data unit forwarding system 100.

After multiplexing the data unit, the receive port manager 102 identifies a header byte string from the data unit. The header byte string includes a subset of the ordered set of individual values (e.g., bytes) from the data unit. For example, the header byte string may include a predetermined number of the first ordered values (e.g., first n bytes) from the data unit. The predetermined number may be any number that is less than or equal to the total number of values in the data unit, however the predetermined number used may be selected to encompass all relevant header data included in the data unit, while remaining small enough that the size of the header byte string does not provide undue burden during subsequent processing of the header byte string.

The receive port manager 102 may also generate a metadata item for the data unit that describes the context of the data unit. For example, the metadata item includes a series of values that describe a context of the data unit that can be used by the various functional components of the protocol independent data unit forwarding system 100 to process the data unit. For example, a functional component may use the values in the metadata item to determine which operation the functional component is to perform to further process the data unit. As each individual operation is performed, the metadata item may be updated to further define the context of the data unit. For example, the metadata item may be updated based on the resulting output of an operation by adding new values to the metadata item, modifying existing values in the metadata item, and the like.

The receive port manager 102 configures some initial data values in the metadata item. For example, the receive port manager 102 may include data values in the metadata item to identify the port via which the data unit was received (e.g., unique port identifier), a data length of the data unit (e.g., byte count), and/or data identifying any errors that may have been detected during reception of the data unit.

As shown, the receive port manager 102 may provide data to the parser 104 and/or the data buffer 110 via the data processing pipeline. The parser 104, header lookup 106, and lookup result processor 108 are configured to process a data unit based on the header byte string and the metadata item. That is, the operations performed by the parser 104, header lookup 106, and lookup result processor 108 can be performed without any portion of the data unit following the header byte string.

Accordingly, the receive port manager 102 may provide the parser 104 with only the header byte string and the metadata item. In this type of embodiment, the receive port manager 102 may copy the portion of the data unit proceeding the header byte string to the data buffer 110 to bypass the parser 104, header lookup 106, and lookup result processor 108. As a result, the portion of the data unit following the header byte string is not transmitted through parser 104, header lookup 106, and lookup result processor 108, which reduces overall resource usage associated with processing the data unit.

Providing the parser 104 with only the header byte string and the metadata item is only one embodiment, however, and is not meant to be limiting. In some embodiments, the receive port manager 102 may transmit the metadata item and the entire data unit or a portion of the data unit that is greater than the header byte string to the parser 104. Further, in some embodiments, the receive port manager 102 may transmit the entire data unit or the portion of the data unit following the header byte string to the data buffer 110 along with some portion of the header byte string to the data buffer 110. Alternatively, the receive port manager 102 may not transmit any data to the data buffer 110, such as in embodiments in which the receive port manager 102 provides the entire data unit to the parser 104. In this type of embodiment, the protocol independent data unit forwarding system 100 may not include the bypass path to the data buffer 110.

The parser 104 is configured to determine the types and locations of the headers that are present in the data unit (e.g., in the header byte string). For example, the parser 104 determines the types of the headers and the offset and width (e.g., a range pair) defining the location of the headers in the data unit.

In general, headers do not include encoded values that identify the header's type. Rather, a previous (e.g., outer) header indicates the header type of the next sequential header in the data unit. Accordingly, the parser 104 uses a header-by-header incremental process to determine the overall structure of the headers included in a data unit.

As the outermost (e.g., first) header does not have a previous header from which to access a next header type, the parser 104 uses the metadata item received from the receive port manager 102 to identify the header type of the outermost (e.g., first) header. Specifically, the parser 104 identifies the header type of the outermost header based on the data identifying the port via which the data unit was received (e.g., unique port identifier). For example, each port or port identifier may be mapped to a header type. Accordingly, the parser 104 determines the header type mapped to the unique port identifier received in the metadata items, which is inferred to be the header type of the outermost header. The mapping between the ports and the header types of the outermost header allows the parser 104 to operate with any of a variety of network types.

The parser 104 parses a layer of headers prior to providing an output to the header lookup 106. A layer of headers is generally a collection of one or more headers that are closely related in a manner such that information from each of the headers is used to analyze or understand the data included in the collection headers. For example, an Ethernet header and a Virtual Local Area Network (VLAN) header can be grouped as a single layer of headers because data included in the VLAN header is used to provide context for the Ethernet header. Similarly, an IPv4 or IPv6 header that is followed by a UDP header may be grouped as a single layer because the UDP header may act as an extension of an IPv4 or IPv6 header with regards to identifying the header type that follows the UDP header. The definition of a header layer and the functionality of parser 104 may be configured as desired such that a header layer does not necessarily have to include headers that are related in the manner described above. For example, the functionality of the parser 104 may be configured such that a header layer includes unrelated headers to account for circumstances where it may be ideal to do so. Similarly, the parser 104 may be configured to split related headers into separate header layers.

Rather than extract data fields from the headers to provide to downstream functional components as separate values, the parser 104 generates metadata describing the headers and provides the metadata to the downstream functional components, such as the header lookup 106. For example, the parser 104 updates the metadata item to include data identifying the header types of the individual headers in the header layer, as well as the location of the header layer and/or the individual headers included in the header layer. The location of a header layer or an individual header may be defined by a range pair that includes an offset value identifying a position (e.g., bit position) at which the header layer or header begins in the data unit (e.g., header byte string), as well as a width value identifying a length (e.g., number of bits) of the header layer or header. The metadata item may include an array of header types and range pairs, which the parser 104 updates to include the determined header types in the header layer and their corresponding range pairs.

The parser 104 provides the metadata item, including the array of header types and range pairs, to the lookup result processor 108. The parser 104 may also provide the header lookup 106 with the header byte string, such as by providing the header lookup 106 with the header byte string alone, header byte string along with some portion of the data unit following the header byte string, or the entirety of the data unit. Providing the downstream functional components (e.g., header lookup 106) with metadata describing the headers, rather than data extracted from the headers, allows each functional component to determine which header fields to use when performing any subsequent operations. This approach provides flexibility while also yielding a compact and efficient implementation.

Figure 2:
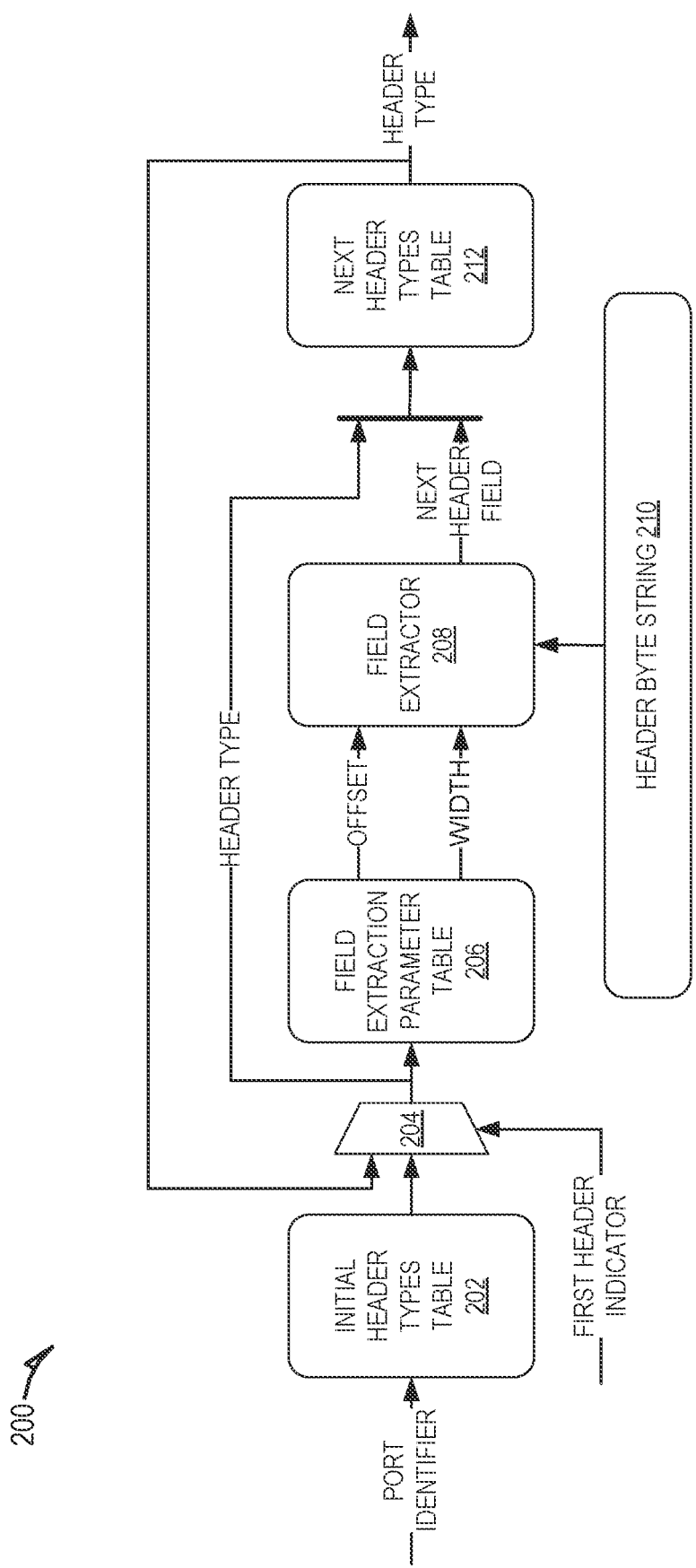
FIG. 2 is a block diagram showing a processing sequence performed by the parser 104, according to some example embodiments.

FIG. 2 is a block diagram showing a processing loop 200 performed by the parser 104, according to some example embodiments. As explained earlier, headers do not include encoded values that identify the header's type, but rather a previous (e.g., outer) header includes data indicating the header type of the next sequential header in a data unit. As the outermost (e.g., first) header does not have a previous header from which to access a next header type, the parser 104 uses data identifying the port via which the data unit was received (e.g., unique port identifier) to infer the header type of the outermost header. For example, the parser 104 accesses the port identifier from the metadata item received from the receive port manager 102.

As shown in FIG. 2, the port identifier is provided as input into an initial header types table 202. The initial header types table 202 includes a listing of port identifiers mapped to header type values. The port identifier can therefore be used as an index into the initial header types table 202 to cause output of the corresponding header type value. The returned header type value is inferred to identify the header type of the outermost header.

A header type value can be non-enumerated (e.g., there are no predefined values for various header types, completely enumerated (e.g., all supported headers have predefined header type values), or partially enumerated (e.g., a value denoting "unknown" or "user data" may be predefined).

The header type value may be derived from either the port identifier when processing the outermost header or a next header field of a preceding header when processing any subsequent headers. Accordingly, a multiplexer 204 is used to select the proper source of the header type value that is provided to downstream components of the processing loop 200. As shown, the multiplexer 204 receives input from both the initial header types table 202 and the next header types table 212, as well as a first header indicator. The first header indicator acts as a control to the multiplexer 204 to cause the multiplexer to select either the output of the initial header types table 202 (e.g., when processing the outermost header) or the output of the next-header types table 212 (e.g., when processing any subsequent header).

The header type value outputted by multiplexer 204 is provided as an input into the field extraction parameters table 206. The field extraction parameters table 206 maintains a listing of range pairs (e.g., offset value and width value) corresponding to various header type values. Accordingly, the header type value is used as an index or search argument into the field extraction parameters table 206 to cause output of the offset value and width value corresponding to the next-header type value.

The offset value and width value are provided as input into the field extractor 208. The field extractor 208 uses the offset value and width value to extract the next-header field from the header byte string 210. For example, the offset value and width value are used to control the logic of the field extractor 208 to cause the field extractor 208 to extract the specified next-header field from the header byte string 210. The next-header field identifies the header type of the subsequent header in the data unit, if any.

The next-header field extracted by the field extractor 208 is concatenated with the header type value outputted by the multiplexer 204 and the resulting concatenated data is provided as input into the next-header types table 212. The next-header types table 212 includes a listing of header types corresponding to various inputs of concatenated header type values and next-header field data. The concatenated data is used to form an index or a search argument into the next-header types table 212 to cause output of a header type corresponding to the input data. The concatenation of the header type value outputted by the multiplexer 204 and next-header field value extracted from the header byte string 210 is used to identify the proper encoding used by header. For example, both Ethernet and VXLAN use 16-bit next-header fields, however the encodings used by each are completely different. Accordingly, the header type identifies the proper encoding, which allows for proper interpretation of the data included in the next-header field.

The header type value that is provided as output by the next-header types table 212 can be used as both an output of the processing loop 200 and as an input to the multiplexer to cause parsing of the subsequent header in the header byte string. For example, the first header indicator can control the multiplexer to select the header type value provided by the next-header types table 212 as input into the field extraction parameters table 206, to cause reiteration of the functionality of the processing loop 200 based on subsequent header, such as determining the range pair of the subsequent header, extracting and next-header field data from the subsequent header, and determining a header type based on the next-header field data extracted from the subsequent header.

Returning to the discussion of FIG. 1, the parser 104 and the header lookup 106 work together to process the data unit header-by-header. For example, the parser 104 is followed in the data processing pipeline by the header lookup 106, and the header lookup 106 is followed by the parser 104 along the recirculation path. Each pass through this header processing loop 116 performed by the parser 104 and header lookup 106 processes or "consumes" a single layer of headers. In each pass through the header processing loop 116, the parser 104 provides the header lookup 106 with an updated metadata item that includes data describing a subsequent layer of headers included in the data unit, such as the header types and range pair for each header in the layer of headers. In turn, the header lookup 106 further processes the data unit based on the subsequent layer of headers.

Once the header lookup 106 is done processing a layer of headers, it may return the data unit to the parser 104 via the recirculation path to cause the parser 104 to parse the next layer of headers. The data unit returned to the parser 104 may be represented by just the metadata item, the metadata item and the header data byte string, or by the metadata item and the entire data unit. Returning the data unit to the parser 104 is typically performed when the header lookup 106 determines that a header represents a tunnel that is being terminated at the current network node. When terminating a tunnel, the payload of a data unit is processed as if it was a newly received data unit. Accordingly, the subsequent layer of headers is parsed and processed in the same general manner as the current layer. Thus, the relationship that the parser 104 and the header lookup 106 share via the recirculation path provides the protocol independent data unit forwarding system 100 with the flexibility to efficiently terminate tunnels, as well as to perform other operations, such as update processing contexts, determine destinations, as described below.

A single, flexible search argument assembly and lookup function supports the various operations performed by the header lookup 106, such as refining the data unit's context (e.g., updating the metadata item), managing the contents of forwarding tables, testing the data unit against access control lists, determining the data unit's destination and/or forwarding requirements, hashing flow-identifying entropy for load balancing purposes, and the like. This flexibility is achieved by using the non-enumerated layer type values generated by the parser 104 to generate search arguments that are used to perform lookup operations in tables that hold keys that are compatible with the assembled search arguments. For example, the header lookup 106 uses data included in the metadata item to retrieve sets of parameters that are used to configure bit-field extractors. Examples of data included in the metadata item include layer type values, offset values, port identifier for a physical receive port, port identifier for a logical receive port, layer 2 forwarding domain, layer 3 forwarding domain, header type, quality of service code points (e.g., priority), address value type (e.g., unicast, multicast, etc.), and the like. The configured bit-field extractors are then used to concatenate arbitrary strings of header data into the search arguments, which are used to perform the lookup operations.

Different types of lookup operations (e.g., search algorithms) may be used for different purposes. For example, an indexed read lookup operation may be used to map a data unit's port identifier to the destination identifier. As another example, an exact-match search lookup operation may be used to bridge Ethernet data units (e.g., Ethernet packets) based on their headers. As another example, a longest-prefix match lookup operation may be used to route data based on their headers (e.g., IPv4 or IPv6). Generation of search arguments and performing lookup operations in this manner enables the header lookup 106 to operate freely of fixed relationships between a data unit's forwarding header type, forwarding method, or the lookup algorithms used to make forwarding or other decisions based on header contents.

Each lookup operation, whether successful or not, returns some data. For example, successful lookups (e.g., those where a matching key is found) return data that is associated with the matching key value. Unsuccessful lookups return default data that is associated with the table in which the lookup operation was performed. In either case, the data returned as a result of a lookup operation can be used to determine a subsequent action performed by the header lookup 106.

At the completion of each individual lookup operation, the header lookup 106 performs a three-way branch decision to either perform another lookup operation, recirculate the data unit back to the parser 104 to parse the subsequent layer of headers, or terminate the header processing loop 116 and provide an output to the lookup result processor 108. The header lookup 106 may determine the appropriate subsequent action based on the output of the previous lookup. For example, the output of a lookup operation may include data identifying a next lookup operation to be performed, such as a pointer to the next lookup operation. This may be used to update the metadata item using lookup operations on the fields of one or more headers.

As another example, the output of a lookup operation may include data indicating that a subsequent layer of headers should to be parsed, necessitating recirculation of the data unit back to the parser 104. For example, this capability may be used to terminate a tunnel.

As another example, the output of a lookup operation may include data instructing the header lookup 106 to terminate the header processing loop 116 and by providing output to the lookup result processor 108. The output provided to the lookup result processor may include the metadata item, metadata item and the header byte string, or the metadata item and entire data unit or a portion of the data unit that is greater than the header byte string.

Prior to providing output to the lookup result processor 108 the header lookup 106 determines a first forwarding instruction to be performed to forward the data unit to its destination. The header lookup 106 determines the first forwarding instruction during performance of the lookup operations described above. The header lookup 106 provides the lookup result processor 108 with data identifying the first forwarding instruction, such as by updating the metadata item to include a value that points to the first instruction. This may be performed using an action instruction that is returned as a result of a destination-determining lookup operation. However, an action associated with a tunnel termination lookup operation or an access control list operation may also be used to set value that points to the first instruction. Similarly, other methods for setting the value that points to the first instruction may also be used.

The lookup result processor 108 uses the value that points to the first instruction to determine a finalized forwarding decision. The forwarding decision may incorporate such behaviors as load balancing, multicast replication, and the like. A number of other functions may be performed by the lookup result processor 108, such as output queue selection. Alternatively, the forwarding decision may be limited to identifying the transmit port to be used to forward the data unit to its intended destination. Typically, a single transmit port may be served by multiple output queues, each with its own relative priority, bandwidth limits, and other quality of service-related characteristics. After identifying the transmit port for the data unit, the lookup result processor 108 may use data included in the metadata item (e.g., the context of the data unit) and values conveyed by its priority related field to select one of the output queues that service the transmit port. After the output queue is selected, the data unit is ready to be enqueued to the output queue for eventual transmission of the data unit.

The data buffer 110 provides temporary storage for a data unit, the queuing of a data unit for retrieval and transmission, and mechanisms for arbitrating among the output queues and implementing specific byte-rate limiting and byte-rate guarantees. In embodiments in which the header byte string is delivered to the data buffer 110 separately from the body of the data unit, the data buffer may also support the merging of the header data byte string with the body byte string to form a complete data unit. Although the data buffer 110 is positioned prior to the header rewrite 112, this is only one embodiment and is not meant to be limiting. In other embodiments, the data buffer 110 may be positioned after the header rewrite 112 in the data processing pipeline.

The header rewrite 112 is responsible for updating the header byte string for a data unit to conform with the requirements of the forwarding method being employed to transmit the data unit and/or the network path that the data unit will follow (e.g., VLANs, tunnels, etc.). Specifically, the header rewrite 112 may strip the encapsulating headers that are associated with terminated tunnels, update the forwarding header, and append new encapsulating headers.

In a simple example, such as VLAN-unaware Ethernet bridging, zero bytes are stripped from the data unit, no changes are made to the forwarding header, and no new encapsulating headers are appended to the data unit. In a more complex example, the any combination of the three actions listed above may be performed by the header rewrite 112.

In some embodiments, the header rewrite 112 uses data included in the metadata item to remove the encapsulating headers that are associated with terminated tunnels. For example, the header lookup 106 may have determined which header is serving as the forwarding header and, the header rewrite 112 may use the offset value for that header to remove the encapsulating headers, such as by removing the headers that located before the offset value.

The header rewrite 112 uses algorithmic modifications to update a forwarding header. For example, the header rewrite 112 performs algorithmic modifications to one or more header fields, such as by decrementing a time-to-live value or by checksum computation. As another example, the header rewrite 112 may translate or map a header field value to another value, such as VLAN ID translation or network address translation.

The header rewrite 112 can use templates to generate new encapsulating headers for the data unit. For example, the header rewrite 112 customizes a template with tunnel-specific values such as source and destination addresses, a time-to-live value, and quality of service code points. The operations performed by the header rewrite 112 may either occur within a buffer that holds the entire data unit or within a separate buffer (e.g., data buffer 110) that holds the header byte string (e.g., containing, at least, the forwarding header). If a separate buffer is used, the updated headers are appended to the remainder of the data unit to form a complete data unit.

The transmit port manager 114 facilitates transmit operations. Although the transmit port manager 114 and the receive port manager 102 are shown as separate functional components, this is just one example and is not meant to be limiting. In some embodiments, the functionality of the transmit port manager 114 and the receive port manager 102 are embodied within a single functional component. The transmit port manager 114 embodies various MACs and operates to transmit data units to other devices in a network via an assortment of external ports. The external ports may include Ethernet, as well as a variety of specialty ports such as CSI, CAN, LIN, and the like. Each port is identified by a unique port identifier.

The transmit port manager 114 may perform a variety of data processing operations to prepare a data unit for transmission to another device. For example, the transmit port manager 114 may perform any media specific adaptations on the received data unit as well as demultiplex the data unit from the data processing pipeline.

Figure 3:
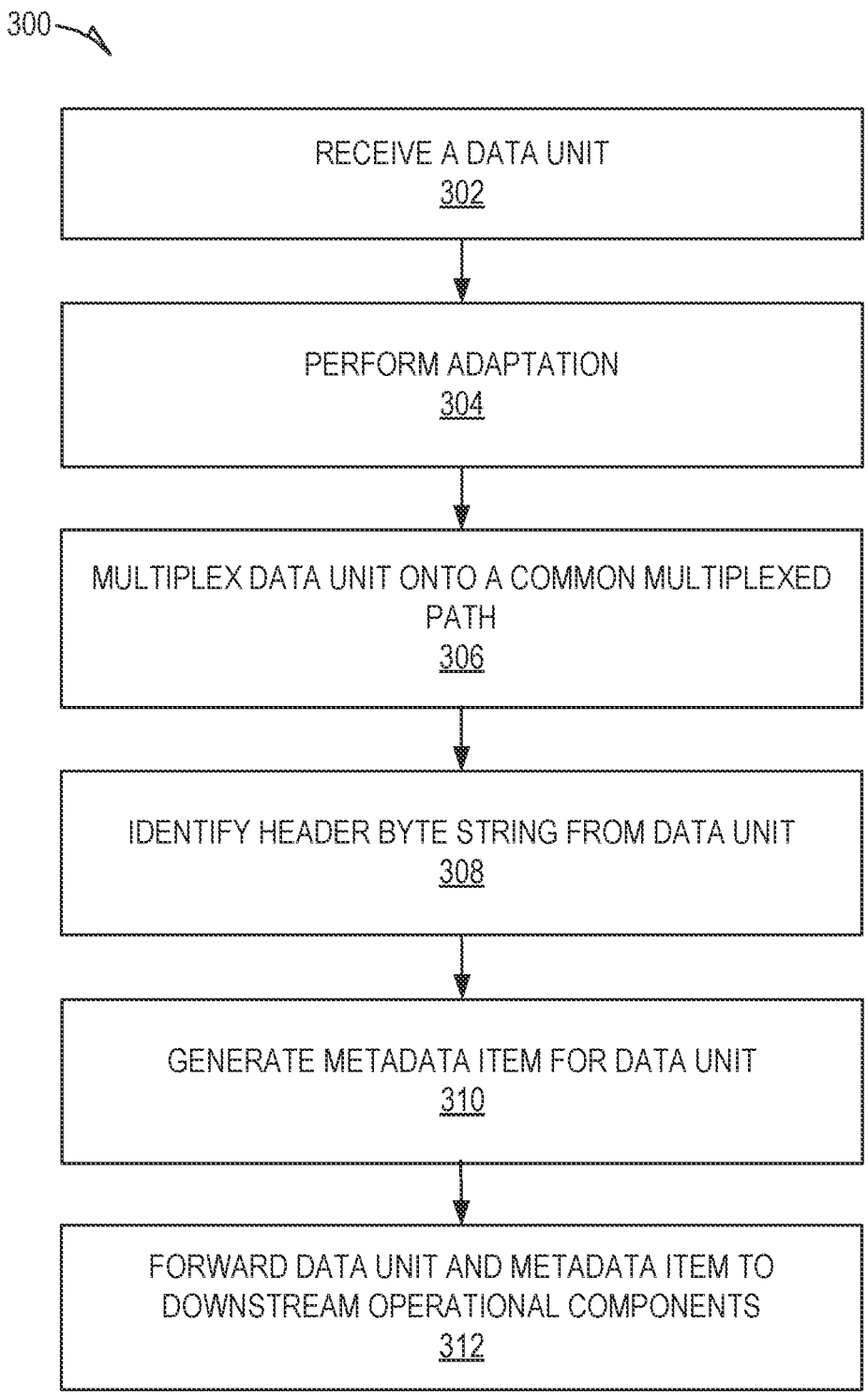
FIG. 3 is a flowchart showing a method for receiving and initial processing of a data unit for protocol independent data unit forwarding, according to some example embodiments.

FIG. 3 is a flowchart showing a method 300 for receiving and initial processing of a data unit for protocol independent data unit forwarding, according to some example embodiments. The method 300 may be embodied in computer readable instructions for execution by one or more processors such that the operations of the method 300 may be performed in part or in whole by the receive port manager 102; accordingly, the method 300 is described below by way of example with reference to the receive port manager 102. However, it shall be appreciated that at least some of the operations of the method 300 may be deployed on various other hardware and/or software configurations and the method 300 is not intended to be limited to the receive port manager 102.

At operation 302, the receive port manager 102 receives a data unit. The receive port manager 102 embodies various MACs and operates to receive data units transmitted in a network via an assortment of external ports. The external ports may include Ethernet, as well as a variety of specialty ports such as CSI, CAN, LIN, and the like. Each port is identified by a unique port identifier.

After receiving a data unit, the receive port manager 102 may perform a variety of data processing operations to generate an output that can be provided to the other functional components of the protocol independent data unit forwarding system 100. For example, at operation 304, the receive port manager 102 performs an adaptation, such as any media specific adaptations on the received data unit. Similarly, at operation 306, the receive port manager 102 multiplexes the data unit onto a common multiplexed path so that the data unit, or any portion, thereof may be transmitted to the other downstream functional components of the protocol independent data unit forwarding system 100.

At operation 308, the receive port manager 102 identifies the header byte string from the data unit. The header byte string includes a subset of the ordered set of individual values from the data unit. For example, the header byte string may include a predetermined number of the first ordered values (e.g., first n bytes) from the data unit. The predetermined number may be any number that is less than or equal to the total number of values in the data unit, however the predetermined number used may be selected to encompass all relevant header data included in the data unit, while remaining small enough that the size of the header byte string does not provide undue burden during subsequent processing of the header byte string.

At operation 310, the receive port manager 102 generates a metadata item for the data unit. The generated metadata item for the data unit can be used to store data that describes the context of the data unit. For example, the metadata item includes a series of values that describe a context of the data unit that can be used by the various functional components of the protocol independent data unit forwarding system 100 to process the data unit. A functional component may use the values in the metadata item to determine which operation the functional component is to perform to further process the data unit. As each individual operation is performed, the metadata item may be updated to further define the context of the data unit. For example, the metadata item may be updated based on the resulting output of an operation by adding new values to the metadata item, modifying existing values in the metadata item, and the like.

The receive port manager 102 configures some initial data values in the metadata item. For example, the receive port manager 102 may include data values in the metadata item to identify the port via which the data unit was received (e.g., unique port identifier), a data length of the data unit (e.g., byte count), a time stamp of the time at which the data unit was received, and/or data identifying any errors that may have been detected during reception of the data unit.

At operation 312, the receive port manager 102 forwards the data unit and the metadata item to downstream operational components of the protocol independent data unit forwarding system 100. For example, the receive port manager 102 may provide the parser 104 with only the header byte string and the metadata item. In this type of embodiment, the receive port manager 102 may copy the portion of the data unit following the header byte string to the data buffer 110 to bypass the parser 104, header lookup 106, and lookup result processor 108. As a result, the portion of the data unit following the header byte string is not transmitted through parser 104, header lookup 106, and lookup result processor 108, which reduces overall resource usage associated with processing the data unit.

In other embodiments, however, the receive port manager 102 may transmit the metadata item and the entire data unit or a portion of the data unit that is greater than the header byte string to the parser 104. Further, in some embodiments, the receive port manager 102 may transmit the entire data unit or the portion of the data unit following the header byte string to the data buffer 110 along with some portion of the header byte string to the data buffer 110. Alternatively, the receive port manager 102 my not transmit any data to the data buffer 110, such as in embodiments in which the receive port manager 102 provides the entire data unit to the parser 104. In this type of embodiment, the protocol independent data unit forwarding system 100 may not include the bypass path to the data buffer 110.

Figure 4:
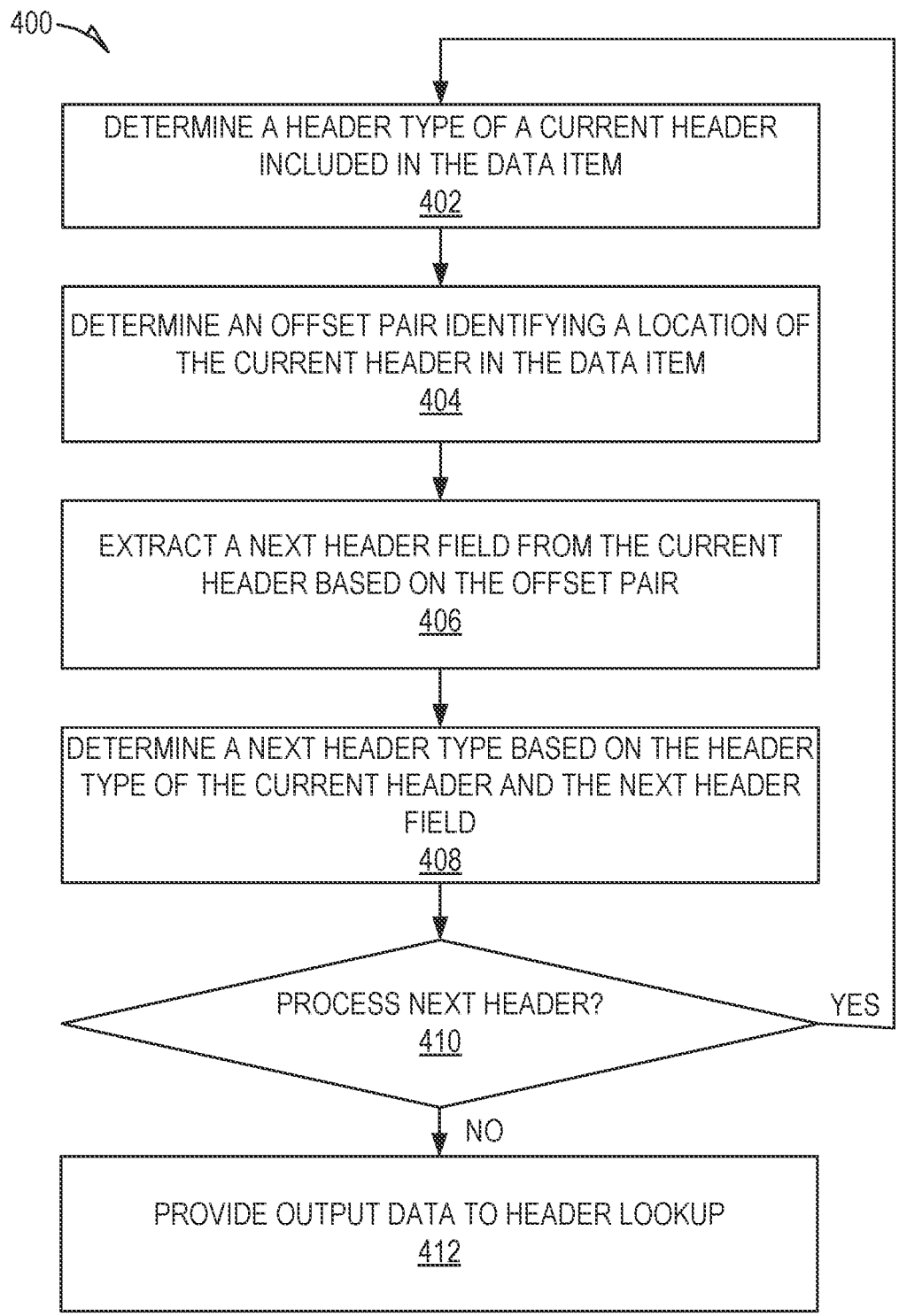
FIG. 4 is a flowchart showing a method for parsing a data unit for protocol independent data unit forwarding, according to some example embodiments.

FIG. 4 is a flowchart showing a method 400 for parsing a data unit for protocol independent data unit forwarding, according to some example embodiments. The method 400 may be embodied in computer readable instructions for execution by one or more processors such that the operations of the method 400 may be performed in part or in whole by receive the parser 104; accordingly, the method 400 is described below by way of example with reference to the parser 104. However, it shall be appreciated that at least some of the operations of the method 400 may be deployed on various other hardware and/or software configurations and the method 400 is not intended to be limited to the parser 104.

At operation 402, the parser 104 determines a header type of a current header included in the data unit. The parser 104 may determine the header type in different ways based on whether the header is the outermost header or any subsequent header in a data unit. In general, headers do not include encoded values that identify the header's type. Rather, a previous (e.g., outer) header indicates the header type of the next sequential header in the data unit. Accordingly, for any header that is subsequent to the outermost header, the parser 104 determines the header type based on the next header field of the preceding header.

As the outermost (e.g., first) header does not have a previous header from which to access a next header type, the parser 104 uses the metadata item received from the receive port manager 102 to identify the header type of the outermost (e.g., first) header. Specifically, the parser 104 identifies the header type of the outermost header based on the data identifying the port via which the data unit was received (e.g., unique port identifier). For example, each port or port identifier may be mapped to a header type. Accordingly, the parser 104 determines the header type mapped to the unique port identifier received in the metadata items, which is inferred to be the header type of the outermost header. The mapping between the ports and the header types of the outermost header allows the parser 104 to operate with any of a variety of network types.

At operation 404, the parser 104 determines a range pair identifying a location of the current header in the data unit. The range pair includes an offset value identifying a position (e.g., bit position) at which the header layer or header begins in the data unit (e.g., header byte string), as well as a width value identifying a length (e.g., number of bits) of the header layer or header. The parser determines the range pair based on the header type of the header. For example, the header type (e.g., header type value) is used as an index or search argument into a field extraction parameters table 206 to cause output of the offset value and width value corresponding to the header type value. The field extraction parameters table 206 maintains a listing of range pairs (e.g., offset value and width value) corresponding to various header type values.

At operation 406, the parser 104 extracts a next-header field from the current header based on the range pair. For example, the parser 104 uses the offset value and width value to control the logic of a field extractor 208 to cause the field extractor 208 to extract the specified next-header field from the header byte string 210. The next-header field identifies the header type of the subsequent header in the data unit, if any.

At operation 408, the parser 104 determines a next header type based on the header type of the current header and the next-header field. For example, the parser 104 concatenates the next-header field with the header type value and the resulting concatenated data is provided as input into a next header types table 212. The next header types table 212 includes a listing of header types corresponding to various inputs of concatenated header type values and next-header field data. The concatenated data is used to form an index or a search argument into the next header types table 212 to cause output of a header type corresponding to the input data.

At operation 410, the parser 104 determines whether to process the next header. For example, the parser 104 may determine whether the current header and the next header are should be included in a single layer of headers that should be processed together by the downstream components of the protocol independent data unit forwarding system 100. A layer of headers is generally a collection of one or more headers that are closely related in a manner such that information from each of the headers is used to analyze or understand the data included in the collection headers, although the definition of a header layer may be configured as desired such that a header layer does not necessarily have to include headers that are related in this manner. For example, a header layer may include headers that are not related as described above and/or headers that are related as described above may be split into separate header layers.

At operation 412, the parser 104 provides output data to the header lookup 106. For example, the parser 104 may provide the header lookup 106 with the metadata item associated with the data unit. The metadata item may include an array of header types and range pairs includes data describing the layers of headers included in the data unit that have been identified by the parser 104. The parser 104 may also provide the header lookup 106 with the header byte string, such as by providing the header lookup 106 with the header byte string alone, header byte string along with some portion of the data unit following the header byte string, or the entirety of the data unit.

Figure 5:
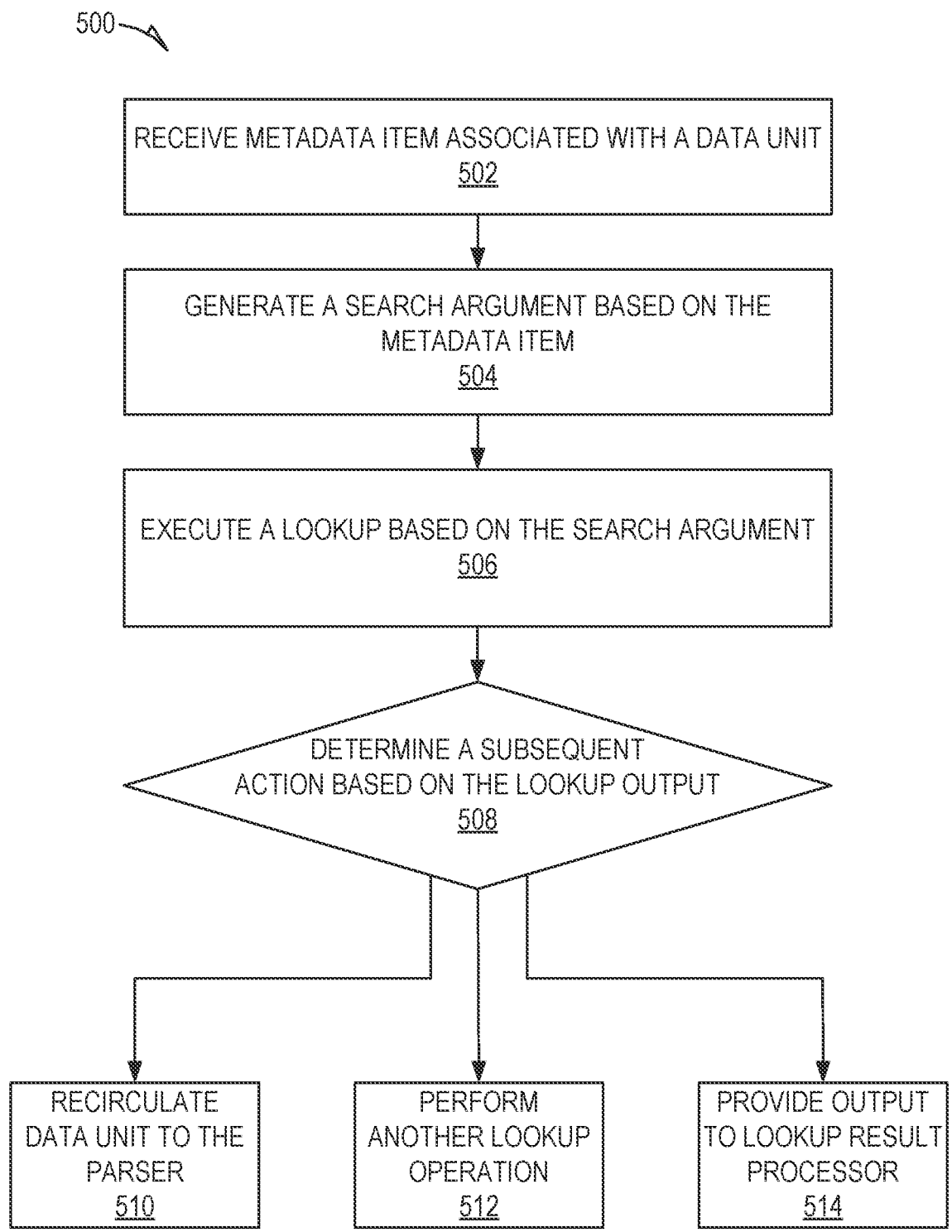
FIG. 5 is a flowchart showing a method of performing a header lookup for protocol independent data unit forwarding, according to some example embodiments.

FIG. 5 is a flowchart showing a method 500 of performing a header lookup for protocol independent data unit forwarding, according to some example embodiments. The method 500 may be embodied in computer readable instructions for execution by one or more processors such that the operations of the method 500 may be performed in part or in whole by receive the header lookup 106; accordingly, the method 500 is described below by way of example with reference to the header lookup 106. However, it shall be appreciated that at least some of the operations of the method 500 may be deployed on various other hardware and/or software configurations and the method 500 is not intended to be limited to the header lookup 106.

At operation 502, the header lookup 106 receives a metadata item associated with a data unit. The metadata item is received from the parser 104 and includes data describing a context of the data unit. For example, the metadata item may include data describing layers of headers included in the data unit (e.g., header types and range pair), port identifier for a physical receive port, port identifier for a logical receive port, layer 2 forwarding domain, layer 3 forwarding domain, header type, quality of service code points (e.g., priority), address value type (e.g, unicast, multicast, etc.), and the like.

At operation 504, the header lookup 106 generates a search argument based on the metadata item. For example, the header lookup 106 uses data included in the metadata item to retrieve a set of parameters that are used to configure bit-field extractors. The parameters may be used to identify a table into which the lookup operation is be performed and select the lookup operation type (e.g., search algorithm) to be used. These parameters may also specify a list of metadata identifiers and a series of offset/width pairs that are used to extract arbitrary strings of bits from the header byte string. The selected metadata and the extracted bit strings are then concatenated to form a search argument.

At operation 506, the header lookup 106 executes a lookup based on the search argument. For example, the search argument is used to perform a lookup operation of the selected lookup operation type in the identified table. Each lookup operation, whether successful or not, returns some data. For example, successful lookups (e.g., those where a matching key is found) return data that is associated with the matching key value. Unsuccessful lookups return default data that is associated with the table in which the lookup operation was performed and/or is associated with the lookup instruction used to initiate the lookup operation.

At operation 508, the header lookup 106 determines a subsequent action based on the lookup output. For example, the data returned as a result of a lookup operation can identify or be used to determine the subsequent action performed by the header lookup 106. As shown, the header lookup 106 performs a three-way branch decision to either perform another lookup operation, recirculate the data unit back to the parser 104 to parse the subsequent layer of headers, or terminate the header processing loop 116 and provide an output to the lookup result processor 108. The header lookup 106 may determine the appropriate subsequent action based on the output of the previous lookup. For example, the output of a lookup operation may include data identifying the subsequent action.

If the header lookup up determines to recirculate the data unit back to the parser 104, the method 500 proceeds to operation 510, where the header lookup 106 recirculates the data unit to the parser 104. For example, this capability may be used to terminate a tunnel.

Alternatively, if the header lookup up determines to perform another lookup operation, the method 500 proceeds to operation 512, where the header lookup 106 performs another lookup operation. This may be used to update the metadata item using lookup operations on the fields of one or more headers.

Alternatively, if the header lookup up determines to terminate the header processing loop 116 and provide an output to the lookup result processor 108, the method 500 proceeds to operation 514, where the header lookup 106 provides output to the lookup result processor 108. The output provided to the lookup result processor 108 may include the metadata item, metadata item and the header byte string, or the metadata item and entire data unit or a portion of the data unit that is greater than the header byte string.

Prior to providing output to the lookup result processor 108 the header lookup 106 determines a first forwarding instruction to be performed to forward the data unit to its destination. The header lookup 106 determines the first forwarding instruction during performance of the lookup operations described above. The header lookup 106 provides the lookup result processor 108 with data identifying the first forwarding instruction, such as by updating the metadata item to include a value that points to the first instruction. This may be performed using an action instruction that is returned as a result of a destination-determining lookup operation. However, an action associated with a tunnel termination lookup operation or an access control list operation may also be used to set a value that points to the first instruction. Similarly, other methods for setting the value that points to the first instruction may also be used.

Figure 6:
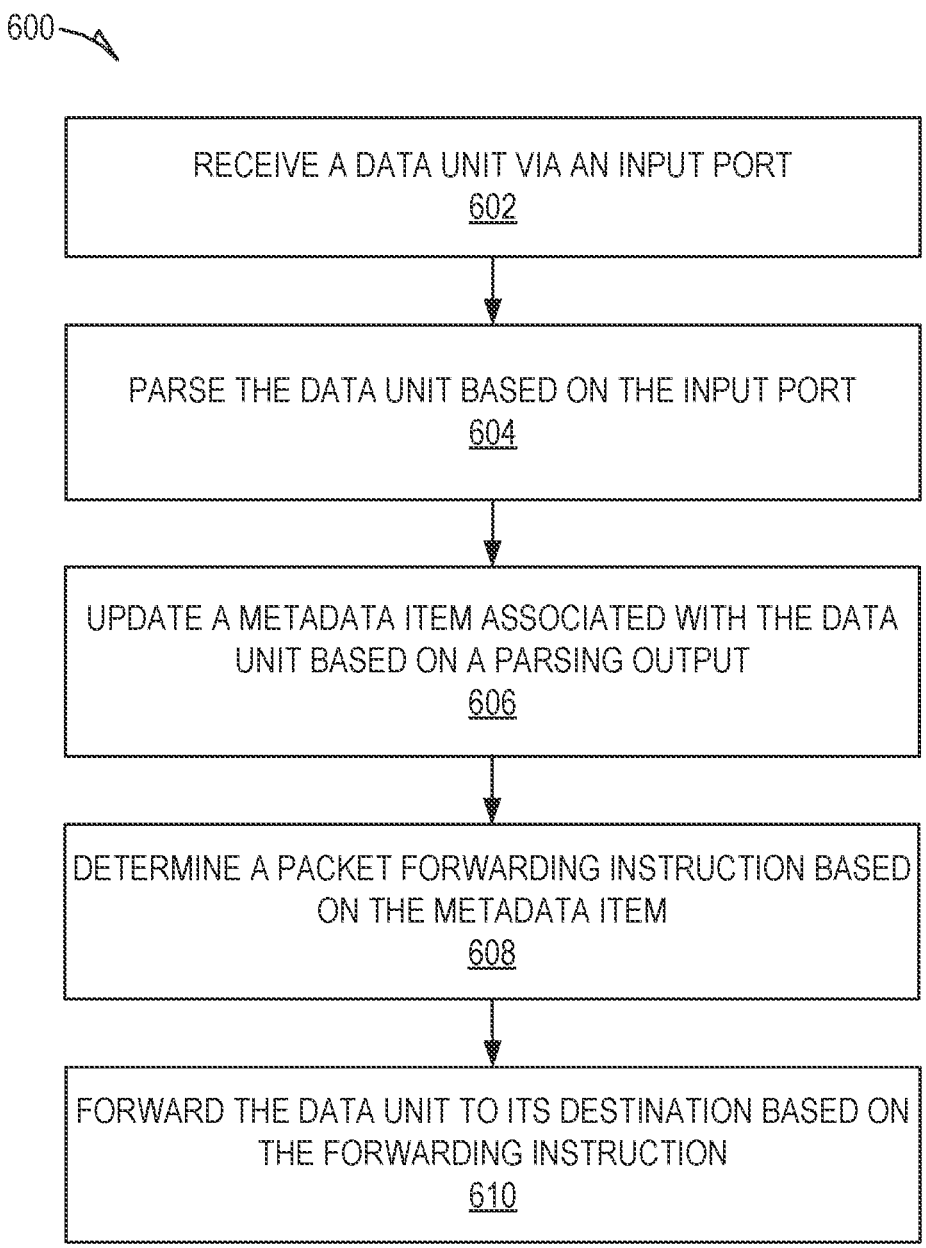
FIG. 6 is a flowchart showing a method of protocol independent data unit forwarding, according to some example embodiments.

FIG. 6 is a flowchart showing a method 600 protocol independent data unit forwarding, according to some example embodiments. The method 600 may be embodied in computer readable instructions for execution by one or more processors such that the operations of the method 600 may be performed in part or in whole by a protocol independent data unit forwarding system 100; accordingly, the method 600 is described below by way of example with reference to the protocol independent data unit forwarding system 100. However, it shall be appreciated that at least some of the operations of the method 600 may be deployed on various other hardware and/or software configurations and the method 600 is not intended to be limited to the protocol independent data unit forwarding system 100.

At operation 602, the receive port manager 102 receives a data unit. The data unit is received via an input port of the protocol independent packet forwarding system 100. The data unit comprises a header byte string that is a subset of the data unit.

At operation 604, the parser 104 parses the data unit based on the input port. For example, the parser determines a header type based on the input port and then determines a range pair defining a set of bits from the header byte string that represent an outermost header in the header byte string. In some embodiments, the parser 104 may also determine another range pair defining a set of bits from the header byte string that represent a subsequent header in the header byte string.

At operation 606, the parser 104 updates a metadata item associate with the data unit based on a parsing output. For example, the parser updates the metadata item to include the range pairs and header types.

At operation 608, the header lookup 106 determines a packet forwarding instruction based on the metadata item. For example, the header lookup 106 may generate a search argument based on the metadata item, and execute a lookup based on the search argument. The header lookup 106 may then determine a subsequent action based on the lookup output.

In some embodiments, the subsequent action is performing a subsequent parsing of the data unit. In this case, the header lookup 106 may instruct the parser 104 to parse the data unit based on a subsequent header type determined based on the lookup output. As a result, the parser 104 updates the metadata item associated with the data unit based on a subsequent parsing output. The header lookup 106 may then generate a subsequent search argument based on the updated metadata item and execute a subsequent lookup based on the subsequent search argument. The header lookup may determine another subsequent action based on the lookup output of the subsequent lookup.

In some embodiments, the subsequent action is to perform another lookup. In this case, the header lookup 106 may update the metadata item associated with the data unit based on the lookup output and generate a subsequent search argument based on the updated metadata item. The header lookup 106 may then execute a subsequent lookup based on the subsequent search argument and determine another subsequent action based on the lookup output of the subsequent lookup.

In some embodiments, the subsequent action is to forward the data unit to the first destination. For example, the lookup output may identify the packet forwarding instruction, which the header lookup 106 can provide to the lookup result processor 108.

At operation 610, the protocol independent data unit forwarding system 100 forwards the data unit to its destination based on the forwarding instruction. For example, the data unit may be forwarded according to the method 700 shown in FIG. 7.

Figure 7:
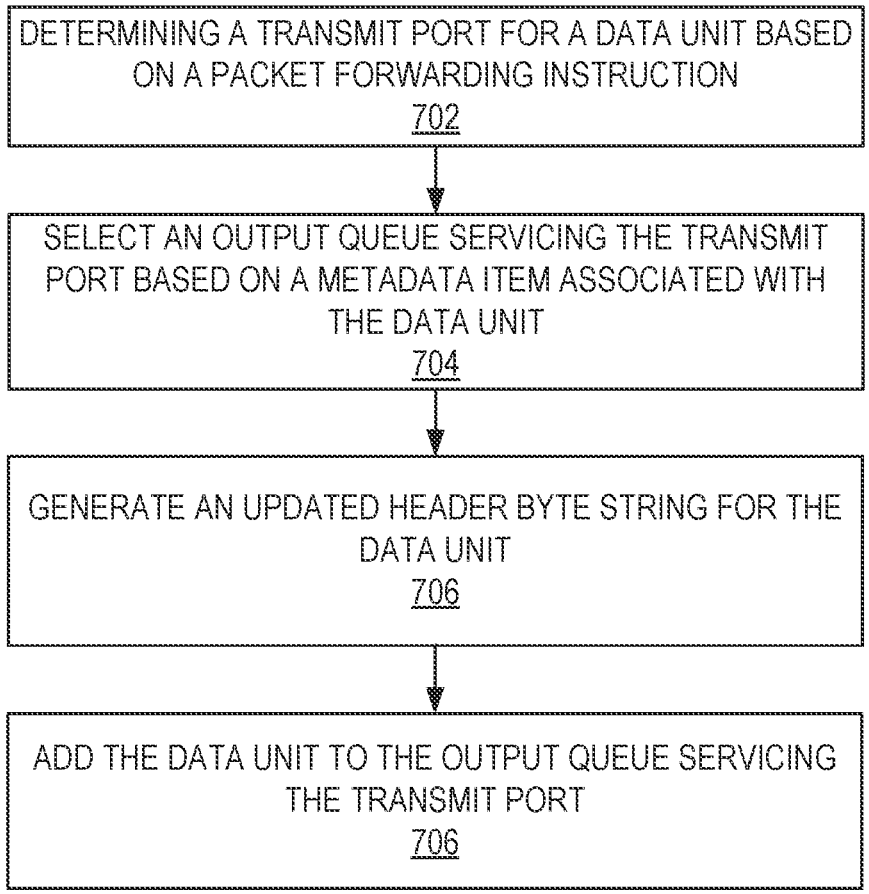
FIG. 7 is a flowchart showing a method of forwarding a data unit to its destination based on a forwarding instruction, according to some example embodiments.

FIG. 7 is a flowchart showing a method 700 of forwarding a data unit to its destination based on a forwarding instruction, according to some example embodiments. The method 700 may be embodied in computer readable instructions for execution by one or more processors such that the operations of the method 700 may be performed in part or in whole by a protocol independent data unit forwarding system 100; accordingly, the method 700 is described below by way of example with reference to the protocol independent data unit forwarding system 100. However, it shall be appreciated that at least some of the operations of the method 700 may be deployed on various other hardware and/or software configurations and the method 700 is not intended to be limited to the protocol independent data unit forwarding system 100.

At operation 702, the lookup result processor 108 determines a transmit port for a data unit based on a packet forwarding instruction. Typically, a single transmit port may be served by multiple output queues, each with its own relative priority, bandwidth limits, and other quality of service-related characteristics. Accordingly, after identifying the transmit port for the data unit, at operation 704, the lookup result processor 108 selects an output queue servicing the transmit port based on a metadata item associated with the data unit. For example, the lookup result processor 108 may use data included in the metadata item (e.g., the context of the data unit) and values conveyed by its priority related field to select one of the output queues that service the transmit port.

At operation 706, the header rewrite 112 generates an updated header byte string for the data unit. The header rewrite 112 is responsible for updating the header byte string for a data unit to conform with the requirements of the forwarding method being employed to transmit the data unit and/or the network path that the data unit will follow (e.g., VLANs, network tunnels, etc.). Specifically, the header rewrite 112 may strip the encapsulating headers that are associated with terminated tunnels, update the forwarding header; and append new encapsulating headers.

In a simple example, such as VLAN-unaware Ethernet bridging, zero bytes are stripped from the data unit, no changes are made to the forwarding header, and no new encapsulating headers are appended to the data unit. In a more complex example, the any combination of the three actions listed above may be performed by the header rewrite 112.

In some embodiments, the header rewrite 112 uses data included in the metadata item to remove the encapsulating headers that are associated with terminated tunnels. For example, the header lookup 106 may have determined which header is serving as the forwarding header and, the header rewrite 112 may use the offset value for that header to remove the encapsulating headers, such as by removing the headers located before the offset value.

The header rewrite 112 uses algorithmic modifications to update a forwarding header. For example, the header rewrite 112 performs algorithmic modifications to one or more header fields, such as by decrementing a time-to-live value or by checksum computation. As another example, the header rewrite 112 may translate or map a header field value to another value, such as a VLAN ID translation or network address translation.

The header rewrite 112 can use templates to generate new encapsulating headers for the data unit. For example, the header rewrite 112 customizes a template with tunnel-specific values such as source and destination addresses, a time-to-live value, and quality of service code points. The operations performed by the header rewrite 112 may either occur within a buffer that holds the entire data unit or within a separate buffer (e.g., data buffer 110) that holds the header byte string (e.g., containing, at least, the forwarding header). If a separate buffer is used, the updated headers is appended to the remainder of the data unit to form a complete packet.

At operation 708, the header rewrite 112 adds the data unit to the output queue servicing the transmit port.

Software Architecture

Figure 8:
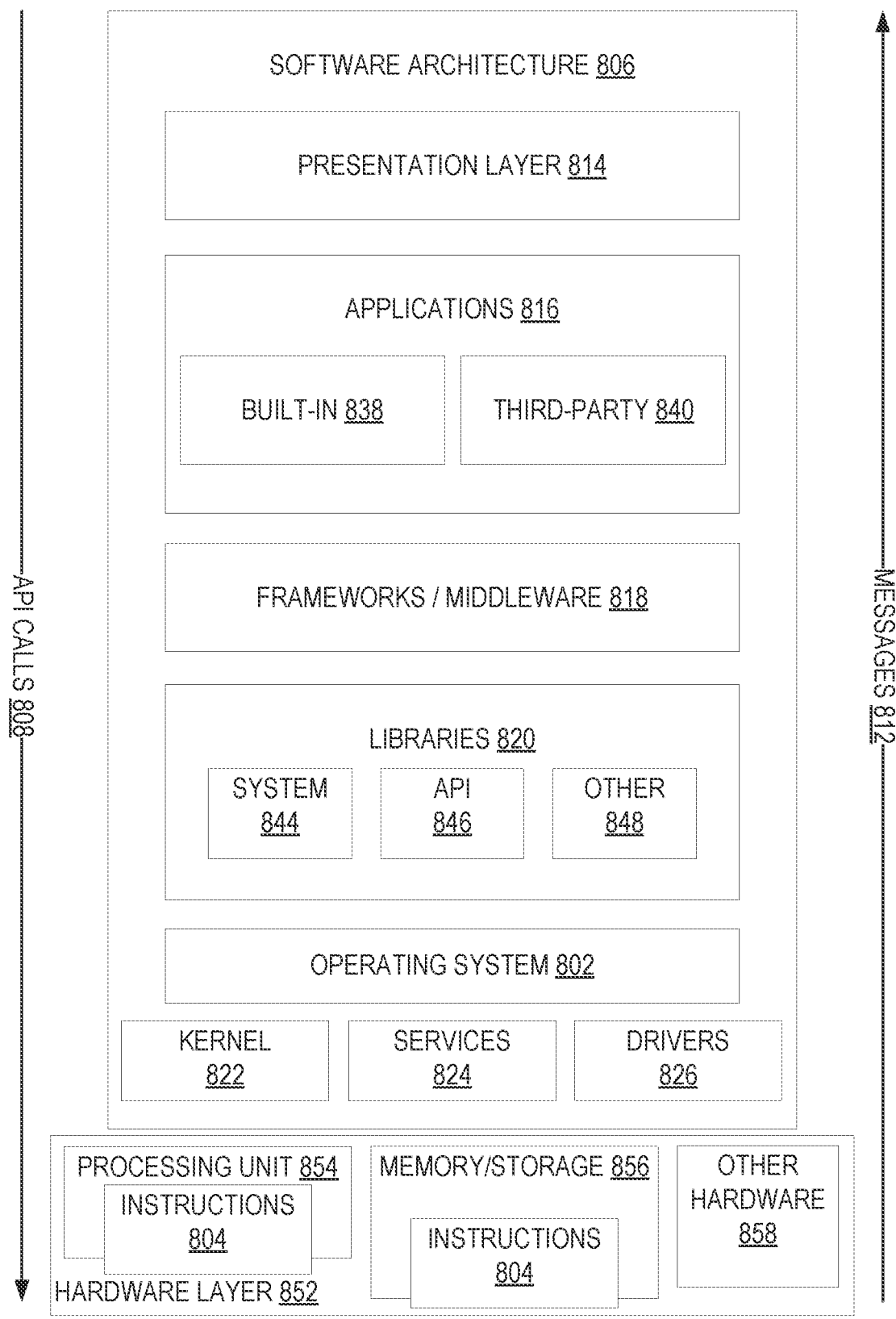
FIG. 8 is a block diagram illustrating an example software architecture, which may be used in conjunction with various hardware architectures herein described.

FIG. 8 is a block diagram illustrating an example software architecture 806, which may be used in conjunction with various hardware architectures herein described. FIG. 8 is a non-limiting example of a software architecture 806 and it will be appreciated that many other architectures may be implemented to facilitate the functionality described herein. The software architecture 806 may execute on hardware such as machine 900 of FIG. 9 that includes, among other things, processors 904, memory 914, and (input/output) I/O components 918. A representative hardware layer 852 is illustrated and can represent, for example, the machine 900 of FIG. 9. The representative hardware layer 852 includes a processing unit 854 having associated executable instructions 804. Executable instructions 804 represent the executable instructions of the software architecture 806, including implementation of the methods, components, and so forth described herein. The hardware layer 852 also includes memory and/or storage modules 856, which also have executable instructions 804. The hardware layer 852 may also comprise other hardware 858.

In the example architecture of FIG. 8, the software architecture 806 may be conceptualized as a stack of layers where each layer provides particular functionality, such as the Open Systems Interconnection model (OSI model). For example, the software architecture 806 may include layers such as an operating system 802, libraries 820, frameworks/middleware 818, applications 816, and a presentation layer 814. Operationally, the applications 816 and/or other components within the layers may invoke application programming interface (API) calls 808 through the software stack and receive a response such as messages 812 in response to the API calls 808. The layers illustrated are representative in nature and not all software architectures have all layers. For example, some mobile or special purpose operating systems may not provide a frameworks/middleware 818, while others may provide such a layer. Other software architectures may include additional or different layers.

The operating system 802 may manage hardware resources and provide common services. The operating system 802 may include, for example, a kernel 822, services 824, and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 820 provide a common infrastructure that is used by the applications 816 and/or other components and/or layers. The libraries 820 provide functionality that allows other software components to perform tasks in an easier fashion than to interface directly with the underlying operating system 802 functionality (e.g., kernel 822, services 824, and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/modules.

The frameworks/middleware 818 (also sometimes referred to as middleware) provide a higher-level common infrastructure that may be used by the applications 816 and/or other software components/modules. For example, the frameworks/middleware 818 may provide various graphical user interface (GUI) functions, high-level resource management, high-level location services, and so forth. The frameworks/middleware 818 may provide a broad spectrum of other APIs that may be used by the applications 816 and/or other software components/modules, some of which may be specific to a particular operating system 802 or platform.

The applications 816 include built-in applications 838 and/or third-party applications 840. Examples of representative built-in applications 838 may include, but are not limited to, a contacts application, a browser application, a book reader application, a location application, a media application, a messaging application, and/or a game application. Third-party applications 840 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 840 may invoke the API calls 808 provided by the mobile operating system (such as operating system 802) to facilitate functionality described herein.

The applications 816 may use built in operating system functions (e.g., kernel 822, services 824, and/or drivers 826), libraries 820, and frameworks/middleware 818 to create UIs to interact with users of the system. Alternatively, or additionally, in some systems, interactions with a user may occur through a presentation layer, such as presentation layer 814. In these systems, the application/component "logic" can be separated from the aspects of the application/component that interact with a user.

Figure 9:
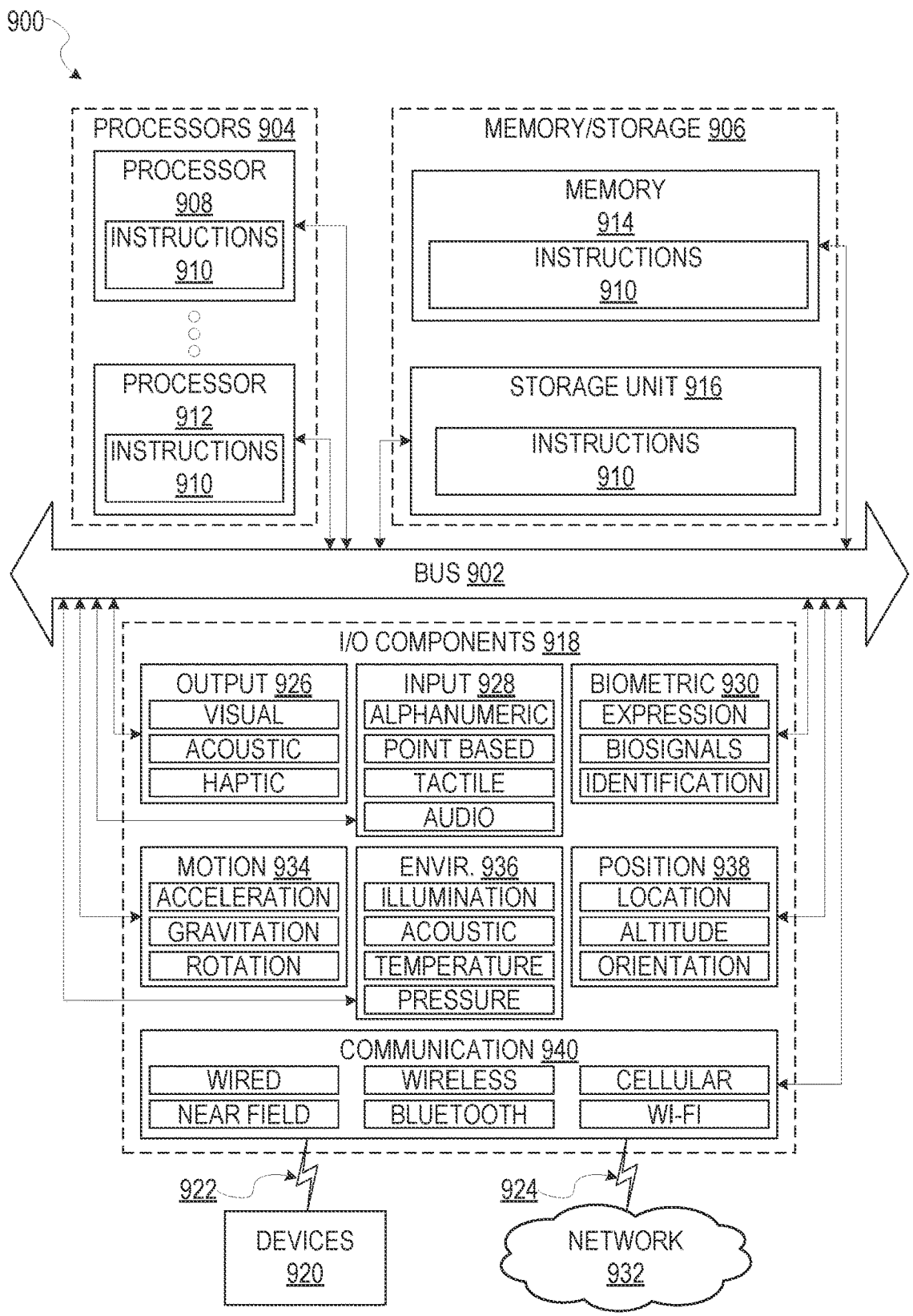
FIG. 9 is a block diagram illustrating components of a machine, according to some example embodiments, able to read instructions from a machine-readable medium (e.g., a machine-readable storage medium) and perform any one or more of the methodologies discussed herein.

FIG. 9 is a block diagram illustrating components of a machine 900, according to some example embodiments, able to read instructions 804 from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application, an applet, an app, or other executable code) for causing the machine 900 to perform any one or more of the methodologies discussed herein may be executed. As such, the instructions 910 may be used to implement modules or components described herein. The instructions 910 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 900 capable of executing the instructions 910, sequentially or otherwise, that specify actions to be taken by machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 904, memory/storage 906, and I/O components 918, which may be configured to communicate with each other such as via a bus 902. The memory/storage 906 may include a memory 914, such as a main memory, or other memory storage, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of processors 904 are examples of machine-readable media.

The I/O components 918 may include a wide variety of components to receive input, provide output, produce output, transmit information, exchange information, capture measurements, and so on. The specific I/O components 918 that are included in a particular machine 900 will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various example embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 918 may include biometric components 930, motion components 934, environmental components 936, or position components 938 among a wide array of other components. For example, the biometric components 930 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 934 may include acceleration sensor components (e.g., accelerometer), gravitation sensor components, rotation sensor components (e.g., gyroscope), and so forth. The environmental components 936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 938 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 932 or devices 920 via coupling 924 and coupling 922, respectively. For example, the communication components 940 may include a network interface component or other suitable device to interface with the network 932. In further examples, communication components 940 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 920 may be another machine or any of a wide variety of peripheral devices (e.g., a peripheral device coupled via a USB).

Moreover, the communication components 940 may detect identifiers or include components operable to detect identifiers. For example, the communication components 940 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940 such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 910 for execution by the machine 900, and includes digital or analog communications signals or other intangible medium to facilitate communication of such instructions 910. Instructions 910 may be transmitted or received over the network 932 using a transmission medium via a network interface device and using any one of a number of well-known transfer protocols.

"CLIENT DEVICE" in this context refers to any machine 900 that interfaces to a communications network 932 to obtain resources from one or more server systems or other client devices. A client device may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 932.

"COMMUNICATIONS NETWORK" in this context refers to one or more portions of a network 932 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 932 or a portion of a network 932 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 910 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 910. The term "machine-readable medium" shall also be taken to include any medium, or combination of multiple media, that is capable of storing instructions 910 (e.g., code) for execution by a machine 900, such that the instructions 910, when executed by one or more processors 904 of the machine 900, cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 904) may be configured by software (e.g., an application 816 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 904 or other programmable processor 904. Once configured by such software, hardware components become specific machines 900 (or specific components of a machine 900) uniquely tailored to perform the configured functions and are no longer general-purpose processors 904. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 904 configured by software to become a special-purpose processor, the general-purpose processor 904 may be configured as respectively different special-purpose processors (e.g., comprising different hardware components) at different times. Software accordingly configures a particular processor or processors 904, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 902) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 904 that are temporarily configured (e.g., by software) or permanently configured to perform the relevant operations. Whether temporarily or permanently configured, such processors 904 may constitute processor-implemented components that operate to perform one or more operations or functions described herein. As used herein, "processor-implemented component" refers to a hardware component implemented using one or more processors 904. Similarly, the methods described herein may be at least partially processor-implemented, with a particular processor or processors 904 being an example of hardware. For example, at least some of the operations of a method may be performed by one or more processors 904 or processor-implemented components. Moreover, the one or more processors 904 may also operate to support performance of the relevant operations in a "cloud computing" environment or as a "software as a service" (SaaS). For example, at least some of the operations may be performed by a group of computers (as examples of machines 900 including processors 904), with these operations being accessible via a network 932 (e.g., the Internet) and via one or more appropriate interfaces (e.g., an API). The performance of certain of the operations may be distributed among the processors 904, not only residing within a single machine 900, but deployed across a number of machines 900. In some example embodiments, the processors 904 or processor-implemented components may be located in a single geographic location (e.g., within a home environment, an office environment, or a server farm). In other example embodiments, the processors 904 or processor-implemented components may be distributed across a number of geographic locations.

"PROCESSOR" in this context refers to any circuit or virtual circuit (a physical circuit emulated by logic executing on an actual processor 904) that manipulates data values according to control signals (e.g., "commands," "op codes," "machine code," etc.) and which produces corresponding output signals that are applied to operate a machine 900. A processor 904 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 904 may further be a multi-core processor having two or more independent processors 904 (sometimes referred to as "cores") that may execute instructions 910 contemporaneously.

What is claimed is:
1. A method comprising:
receiving, by a packet forwarding system, a first data unit, the first data unit received via an input port of the packet forwarding system, the first data unit comprising a header byte string;
determining, based on the input port, a first header type of a first header of the first data unit;
parsing, by a parser, the first data unit based on the first header type to yield a first parsing output that describes the header byte string of the first data unit;
updating a metadata item associated with the first data unit based on the first parsing output;
determining, based on the metadata item associated with the first data unit, a first packet forwarding instruction by:
generating a first search argument based on the metadata item;
executing a first lookup based on the first search argument, yielding a first lookup output; and
determining a subsequent action based on the first lookup output, the subsequent action being selected from a group that comprises one of recirculating the first data unit to the parser to parse for a next layer of headers of the first data unit, execute a second lookup based on the first lookup output, and provide a lookup result processor with data identifying the first packet forwarding instruction, the recirculating of the first data unit to the parser comprising returning the metadata item and the header byte string to the parser; and forwarding the first data unit to a first destination based on the first packet forwarding instruction.

2. The method of claim 1, wherein the subsequent action is to execute the second lookup based on the first lookup output, and wherein the determining of the first packet forwarding instruction further comprises:

updating the metadata item associated with the first data unit based on the first lookup output, yielding an updated metadata item associated with the first data unit;

generating a second search argument based on the updated metadata item;

executing the second lookup based on the second search argument, yielding a second lookup output; and determining a second subsequent action based on the second lookup output.

3. The method of claim 2, wherein the second subsequent action is to perform a subsequent parsing of the first data unit.

4. The method of claim 1, wherein the forwarding of the first data unit to the first destination based on the first packet forwarding instruction comprises:

determining a transmit port for the first data unit based on the first packet forwarding instruction;

selecting an output queue servicing the transmit port based on the metadata items associated with the first data unit;

generating an updated header byte string for the first data unit; and adding the first data unit to the output queue to be transmitted to the first destination via the transmit port, the first data unit having been updated based on the updated header byte string.

5. The method of claim 1, wherein the data provided to the lookup result processor further comprises one of the metadata item, the metadata item and the header byte string, the metadata item and the data unit in its entirety, or the metadata item and at least a portion of the data unit that is greater than the header byte string.

6. The method of claim 1, wherein to provide the lookup result processor with the data identifying the first packet forwarding instruction comprises updating the metadata item to include a value that points to the first packet forwarding instruction.

7. The method of claim 6, wherein the updating of the metadata item comprises using either an action associated with a tunnel termination lookup operation or an action associated with an access control list operation.

8. The method of claim 1, wherein only the metadata item and the header byte string are returned to the parser to recirculate the first data unit to the parser.

9. A system comprising:

a port manager functional component comprising at least a first input port, wherein the port manager functional component is configured to perform operations comprising:

receiving a first data unit via the first input port, the first data unit comprising a header byte string that is a subset of the first data unit;

determining, based on the input port, a first header type of a first header of the first data unit; and a parser functional component configured to perform operations comprising:

parsing the first data unit based on the first header type to yield a first parsing output that describes the header byte string of the first data unit;

updating a metadata item associated with the first data unit based on the first parsing output;

a header lookup functional component configured to perform operations comprising:

determining, based on the metadata item associated with the first data unit, a first packet forwarding instruction by:

generating a first search argument based on the metadata item;

executing a first lookup based on the first search argument, yielding a first lookup output; and determining a subsequent action based on the first lookup output, the subsequent action being selected from a group that comprises one of recirculating the first data unit to the parser functional component to parse for a next layer of headers of the first data unit, execute a second lookup based on the first lookup output, and provide a lookup result processor with data identifying the first packet forwarding instruction, the recirculating of the first data unit to the parser comprising returning the metadata item and the header byte string to the parser; and a lookup result processor functional component configured to perform operations comprising:

forwarding the first data unit to a first destination based on the first packet forwarding instruction.

10. The system of claim 9, wherein the subsequent action is to execute the second lookup based on the first lookup output, and wherein the determining of the first packet forwarding instruction further comprises:

updating the metadata item associated with the first data unit based on the first lookup output, yielding an updated metadata item associated with the first data unit;

generating a second search argument based on the updated metadata item;

executing the second lookup based on the second search argument, yielding a second lookup output; and determining a second subsequent action based on the second lookup output.

11. The system of claim 10, wherein the second subsequent action is to perform a subsequent parsing of the first data unit.

12. The system of claim 9, wherein the forwarding of the first data unit to the first destination based on the first packet forwarding instruction comprises:

determining a transmit port for the first data unit based on the first packet forwarding instruction;

selecting an output queue servicing the transmit port based on the metadata items associated with the first data unit;

generating an updated header byte string for the first data unit; and adding the first data unit to the output queue to be transmitted to the first destination via the transmit port, the first data unit having been updated based on the updated header byte string.

13. The system of claim 9, wherein the data provided to the lookup result processor further comprises one of the metadata item, the metadata item and the header byte string, the metadata item and the data unit in its entirety, or the metadata item and at least a portion of the data unit that is greater than the header byte string.

14. The system of claim 9, wherein to provide the lookup result processor with the data identifying the first packet forwarding instruction comprises updating the metadata item to include a value that points to the first packet forwarding instruction.

15. The system of claim 14, wherein the updating of the metadata item comprises using either an action associated with a tunnel termination lookup operation or an action associated with an access control list operation.

16. The system of claim 9, wherein only the metadata item and the header byte string are returned to the parser to recirculate the first data unit to the parser.

17. A system comprising:
a physical device configured to forward data units using various communication protocols, the physical device configured to perform operations comprising:
receiving a first data unit via a first input port of the physical device, the first data unit comprising a header byte string that is a subset of the first data unit;
determining, based on the input port, a first header type of a first header of the first data unit;
parsing, by a parser, the first data unit based on the first header type to yield a first parsing output that describes the header byte string of the first data unit;
updating a metadata item associated with the first data unit based on the first parsing output;
determining, based on the metadata item associated with the first data unit, a first packet forwarding instruction by:
generating a first search argument based on the metadata item;
executing a first lookup based on the first search argument, yielding a first lookup output; and
determining a subsequent action based on the first lookup output, the subsequent action being selected from a group that comprises one of recirculating the first data unit to the parser to parse for a next layer of headers of the first data unit, execute a second lookup based on the first lookup output, and provide a lookup result processor with data identifying the first packet forwarding instruction, the recirculating of the first data unit to the parser comprising returning the metadata item and the header byte string to the parser; and
forwarding the first data unit to a first destination based on the first packet forwarding instruction.

18. The system of claim 17, wherein the subsequent action is to execute the second lookup based on the first lookup output, and wherein the determining of the first packet forwarding instruction further comprises:
updating the metadata item associated with the first data unit based on the first lookup output, yielding an updated metadata item associated with the first data unit;
generating a second search argument based on the updated metadata item;
executing the second lookup based on the second search argument, yielding a second lookup output; and
determining a second subsequent action based on the second lookup output.

19. The system of claim 18, wherein the second subsequent action is to perform a subsequent parsing of the first data unit.

20. The system of claim 17, wherein the forwarding of the first data unit to the first destination based on the first packet forwarding instruction comprises:
determining a transmit port for the first data unit based on the first packet forwarding instruction;
selecting an output queue servicing the transmit port based on the metadata items associated with the first data unit;
generating an updated header byte string for the first data unit; and
adding the first data unit to the output queue to be transmitted to the first destination via the transmit port, the first data unit having been updated based on the updated header byte string.

* * * * *